UNITED STATES PATENT OFFICE.

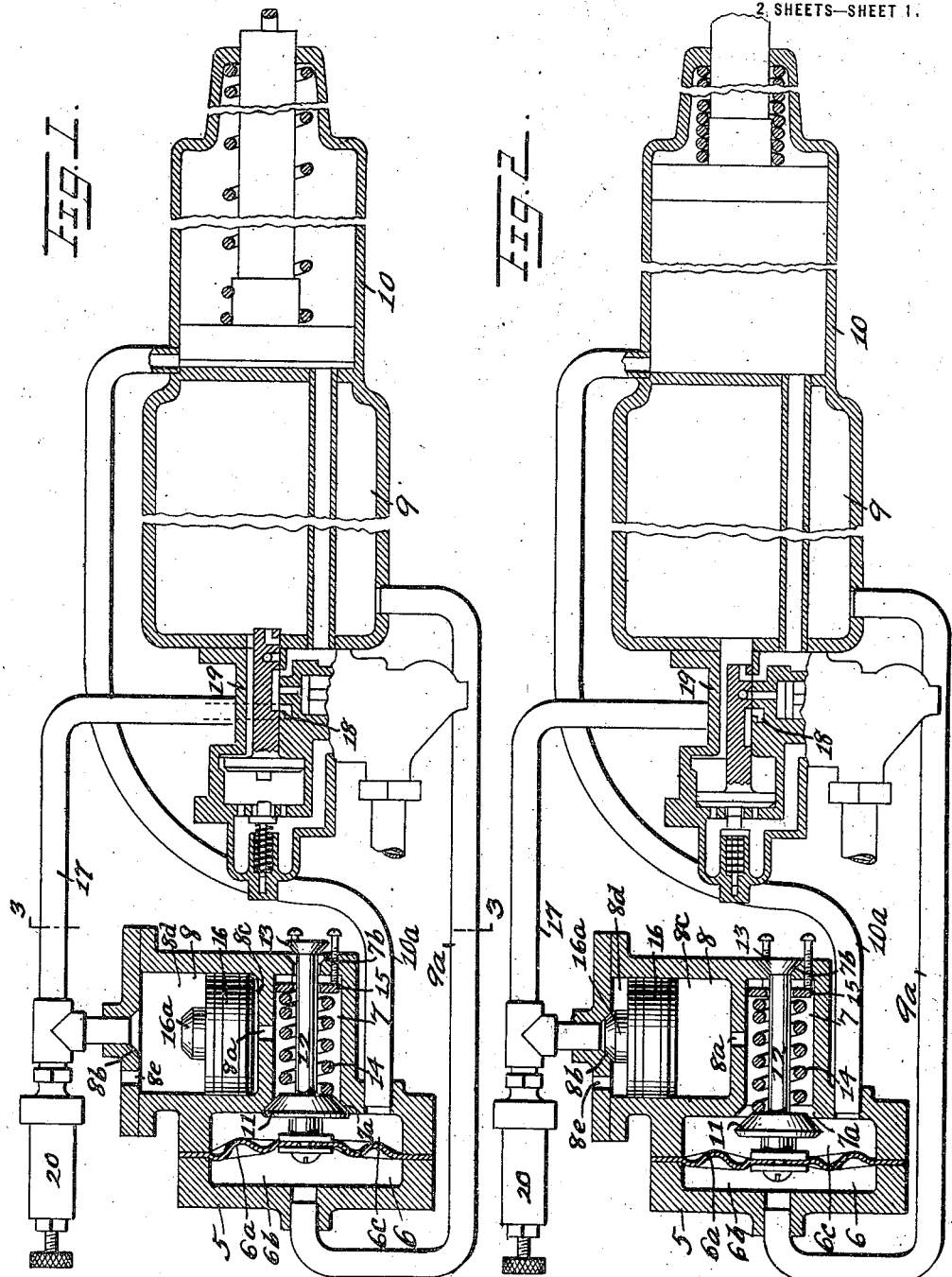

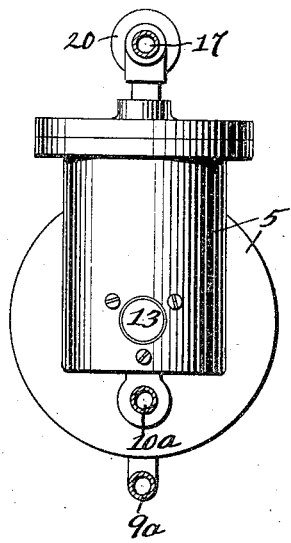
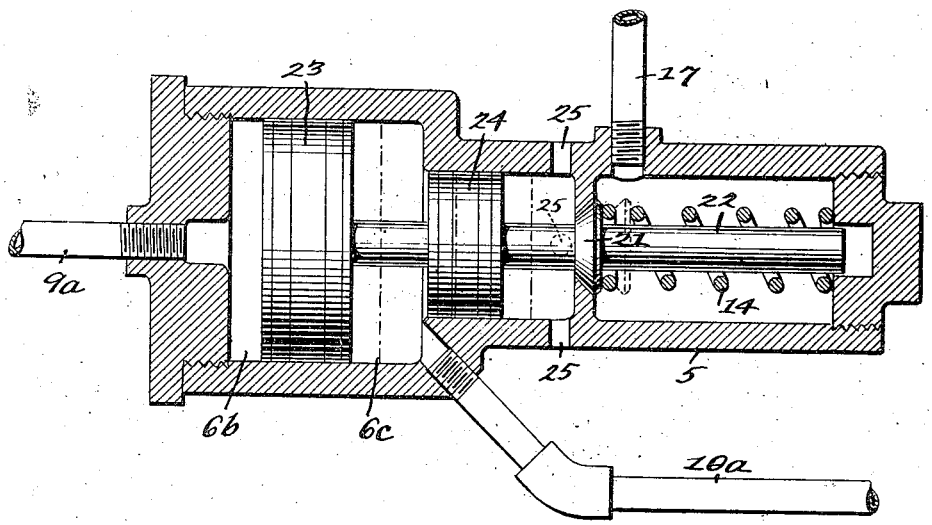

ERNEST U. MACK, OF FLORENCE, SOUTH CAROLINA.

AUTOMATIC RETAINING-VALVE FOR AIR-BRAKE SYSTEMS.

1,161,712.

Specification of Letters Patent.

Patented Nov. 23, 1915.

Application filed February 16, 1915. Serial No. 8,442.

*To all whom it may concern:*

Be it known that I, ERNEST U. MACK, a citizen of the United States, and a resident of Florence, in the county of Florence and State of South Carolina, have invented certain new and useful Improvements in Automatic Retaining-Valves for Air-Brake Systems, of which the following is a specification.

The object of my invention is to provide a safety device in an air-brake system which will automatically close the exhaust outlet from the triple-valve when a full application of the brakes has been made and the air pressures equalize in the auxiliary reservoir and brake cylinder under each car of a train, and thus retain the pressure in the brake cylinder while the auxiliary reservoir is being re-charged with air from the main reservoir on the locomotive.

As is well known, when the pressures equalize in the auxiliary reservoir and brake cylinder, while the train is moving down grade, it is impossible to re-charge the auxiliary reservoirs with air or make any further application of the brakes without first releasing the brakes, which is extremely dangerous on account of the liability of the train to run away while auxiliary reservoirs are being re-charged, unless the present type of retaining valves have already been set on each car by hand before starting the down grade, and these retaining valves must all be again restored by hand at the foot of the grade on each car.

My invention provides a device of simple construction which will not easily get out of order to require repair and which will automatically operate for safety when the danger point is reached.

My invention will also save much time in turning on and off the hand operated retaining valves now in use, and will eliminate the danger to the lives of trainmen in passing over tops of freight trains covered with snow, sleet, and ice.

My invention also permits greater speed of train because of full brake cylinder and auxiliary reservoir pressures available.

My invention is fully described in the following specification, of which the accompanying drawings form a part, in which like reference characters refer to like parts in each of the views, and in which:—

Figure 1 is a longitudinal section taken through one form of my invention, in operative connection with the auxiliary reservoir, brake cylinder, and triple-valve, intended to be installed beneath each car of a train, with the parts in one position; Fig. 2 is a similar view with the parts in alternate positions; Fig. 3 is a section taken on the line 3—3 of Fig. 1; and Fig. 4 is a sectional view through a modified form of my invention.

In the drawings forming a part of this application I have shown two forms of construction of my device, the form shown in Figs. 1 to 3, inclusive, comprising a casing 5 having three chambers 6, 7, and 8, the first of which is divided into two compartments by means of a diaphragm $6^a$, the compartments being designated $6^b$ and $6^c$, the first of which is in constant communication with the auxiliary reservoir 9 by means of a pipe $9^a$, and the latter of which is in constant communication with the brake cylinder 10 by means of a pipe $10^a$.

The compartment $6^c$ is adapted to be placed in communication with the chamber 7 through a port $7^a$ controlled by a valve 11 carried by a rod 12 secured to the diaphragm $6^a$ and having a supplemental valve 13 at the opposite end thereof controlling a port $7^b$ adapted to connect the chamber 7 with the outer air; the valve 11 is normally closed against a spring 14 the tension of which is adjustable by means of an adjustable plate 15, and in this normal position of the valve 11 the valve 13 is open, as shown in Fig. 1.

The chamber 8 is in constant communication with the chamber 7 by means of a port $8^a$ and said chamber is divided into two compartments by means of a piston 16 having a cone valve $16^a$ thereon adapted to be seated in a port $8^b$ leading to a pipe 17 in constant communication with the exhaust port 18 of a triple-valve 19, and provided with a safety valve 20, the compartments of the chamber 8 being designated $8^c$ and $8^d$, and the compartment $8^d$ of the chamber 8 is adapted to communicate directly with the atmosphere through a port $8^e$.

When air pressure is pumped up in the auxiliary reservoir 9 the pressure increases in the compartment $6^b$ of the chamber 6 through the pipe $9^a$; for purposes of explanation let us assume that the diaphragm $6^a$ has an area of two square inches, the valve 11 an area of seven-tenths of a square inch, and the spring 14 a pressure of thirty-eight pounds; as soon as a pressure exceeding nineteen pounds per square inch is attained in the compartment 6$^b$, the spring 14 is overcome and valve 11 is forced to its seat where it is held by the pressure in the compartment 6$^b$ as long as the air pressure in the auxiliary reservoir is in excess of that in the brake cylinder.

When a full application of the brakes is made and the air pressures in the auxiliary reservoir and the brake cylinder equalize, the air passes through the pipe 10$^a$ to the compartment 6$^c$, and the combined forces of the spring 14, (38 lbs.) and the pressure of air (50 lbs.) in compartment 6$^c$ acting upon an effective area one and three-tenths square inches on diaphragm 6$^a$ (2″—.7″ equals 1.3″), (or 38 lbs. plus 65 lbs. equals 103 lbs.) overcome the pressure in the compartment 6$^b$ which is one hundred pounds, (50 lbs. × 2″), and the valve 11 moves from its seat and opens the port 7$^a$, permitting air from the brake cylinder and compartment 6$^c$ to pass to the chamber 7, and thence to the compartment 8$^c$ through the port 8$^a$; this air pressure causes the piston 16 to rise and seats the cone 16$^a$ in the port 8$^b$, and closing off the previous communication of the exhaust port 18 of the triple-valve with the atmosphere through the compartment 8$^d$ and vent 8$^e$. The engineer may now move his brake valve to "release" position and recharge the train-line and all the auxiliary reservoirs under all the cars, each triple-valve at this time opening the exhaust from the respective brake cylinder; this air, however, cannot escape from the brake cylinders for the reason that the respective cone valves 16$^a$ are closed as already explained, and the brakes are thus held applied while the auxiliary reservoirs are being re-charged. It will be understood that the same movement that opens the valve 11 closes the valve 13 so no air may escape from the chamber 7. As soon as the valve 11 moves from its seat the pressures of air in the compartment 6$^c$ and chamber 7 are equalized, and the pressure of air in the compartment 6$^c$ becomes effective upon the whole area of the diaphragm 6$^a$ less the area of the stem 12; this pressure includes the one hundred pounds, resulting from the fifty pounds being multiplied by the area 2″, and the thirty-eight pounds spring pressure, a total of one hundred and thirty-eight pounds, now acting to hold the valve 11 open and the valve 13 closed. Pressure may now be raised in the auxiliary reservoir and compartment 6$^b$ to seventy pounds per square inch, or one hundred and forty pounds for the two square inches of area, and the diaphragm will again be over-balanced, valve 11 closed, and valve 13 opened; air from compartment 8$^c$ will now escape through the ports 8$^a$ and 7$^b$ to the atmosphere, and the piston 16 will fall by gravity and the pressure of air on the cone valve 16$^a$, and the air from the brake cylinder 10 will now exhaust through the triple-valve, pipe 17, and ports 8$^b$ and 8$^c$, releasing the brakes.

Anywhere short of a full reduction of air pressure, the brakes may be applied and released without any interference with the device, as it acts only at the danger point of equalization. Once valve 11 has been automatically opened, thereby closing the valve 16$^a$, all auxiliary reservoirs may be recharged anywhere short of seventy pounds per square inch and further reductions may be made in brake pipe pressure to give added pressure in brake cylinders if desired.

In Fig. 4 is shown a modification, over the form described, which operates in a similar manner with the exception that the valve 21, the equivalent of the valve 16$^a$, is mounted directly upon the rod 22, the equivalent of the rod 12, but the pressures operate in the chambers 6$^b$ and 6$^c$ in the manner already described; instead of the diaphragm 6$^a$ I show a piston 23 which serves to move the rod 22, and I show a piston 24 of less area than the piston 23 to supplant the valve 11. When the pressure in the auxiliary reservoir exceeds that in the brake cylinder the piston 23 moves to the right and opens the valve 21, thus allowing the air from the triple-valve exhaust port 18 to pass through the pipe 17, past the valve 21, and through the vent 25. When the pressure in the brake cylinder equalizes with that in the auxiliary reservoir the air passes through the pipe 10$^a$ and, aided by the spring 14, moves the piston 23 to the left, thus closing the valve 21, and the air from the brake cylinders cannot exhaust through the triple-valves.

When the pressures equalize on both sides of the piston 23 the spring 14 closes the valve 21 and the air from the brake cylinder, exhausting through the tripple-valve, cannot exhaust past this valve 21; this pressure, fifty pounds, however, acts upon the area of the valve 21 with a pressure of approximately thirty-eight pounds and holds it closed; this needs to be overcome by an excess pressure of about twenty pounds per square inch in the auxiliary reservoir and corresponding side of the piston 23 before the valve 21 will again open to permit the escape of air from the brake cylinder to the atmosphere, and the brakes are thus held applied until the auxiliary reservoir is recharged.

While I have shown present preferred forms of embodiment of my invention, I do not limit myself thereto, but may make changes thereover, within the scope of the following claims, without departing from the spirit of my invention or sacrificing its advantages.

Having thus described my invention, I claim as new and desire to secure by Letters Patent:—

1. In an air brake system provided with a brake cylinder, an auxiliary reservoir, and a triple valve having a brake cylinder exhaust port; the combination of a casing, a valve therein controlling said exhaust port, means including elements of different air pressure areas for controlling said valve, a pipe connecting said reservoir with said casing on one side of one element, and a pipe connecting said brake cylinder with said casing between said elements.

2. In an air brake system provided with a brake cylinder, an auxiliary reservoir, and a triple valve having a brake cylinder exhaust; the combination of a casing, two elements of different diameters and areas movable therein, a rod connecting said elements, an air release valve on said rod controlling an air escape port in said casing, and a valve controlling the escape of air from said triple valve exhaust port, said casing being in operative connection with said cylinder and reservoir and said valves being operable into and out of closed positions by the movements of said elements due to variations in air pressures in said cylinder and reservoir.

3. In an air brake system provided with a brake cylinder, an auxiliary reservoir, and a triple valve having a brake cylinder exhaust port; the combination of a casing, a diaphragm therein, a valve therein, a rod connecting said diaphragm and valve, a pipe connecting said cylinder with said casing between said diaphragm and valve, a pipe connecting said reservoir and casing on the outer side of said diaphragm, a pipe connecting said exhaust port with the outer air through said casing, and a supplemental valve for said exhaust pipe operable by the variations in air pressures in said cylinder and reservoir pipes.

4. In an air brake system provided with a brake cylinder, an auxiliary reservoir, and a triple valve having a brake cylinder exhaust port; the combination of a casing, a valve therein controlling said exhaust port, means including elements of different air pressure areas for controlling said valve, a pipe connecting said reservoir with said casing on one side of one element, and a pipe connecting said brake cylinder with said casing between said elements, said casing having passages therein permitting the air from said last named pipe to impinge on said valve to close the same when the pressure in both pipes is equalized.

In testimony whereof I have signed my name to this specification in the presence of two subscribing witnesses.

ERNEST U. MACK.

Witnesses:
J. W. HICKS,
HENRY E. DAVIS.

Copies of this patent may be obtained for five cents each, by addressing the "Commissioner of Patents, Washington, D. C."